US012225367B2

(12) United States Patent
Zheng

(10) Patent No.: US 12,225,367 B2
(45) Date of Patent: Feb. 11, 2025

(54) VIRTUAL HEIGHT AND SURROUND EFFECT IN SOUNDBAR WITHOUT UP-FIRING AND SURROUND SPEAKERS

(71) Applicant: HARMAN INTERNATIONAL INDUSTRIES, INCORPORATED, Stamford, CT (US)

(72) Inventor: James Zheng, Guangdong (CN)

(73) Assignee: Harman International Industries, Incorporated, Stamford, CT (US)

( * ) Notice: Subject to any disclaimer, the term of this patent is extended or adjusted under 35 U.S.C. 154(b) by 576 days.

(21) Appl. No.: 17/435,809

(22) PCT Filed: Mar. 6, 2019

(86) PCT No.: PCT/CN2019/077139
§ 371 (c)(1),
(2) Date: Sep. 2, 2021

(87) PCT Pub. No.: WO2020/177095
PCT Pub. Date: Sep. 10, 2020

(65) Prior Publication Data

US 2022/0150653 A1 May 12, 2022

(51) Int. Cl.
*H04S 3/00* (2006.01)
*H04R 3/14* (2006.01)
(Continued)

(52) U.S. Cl.
CPC ............... *H04S 3/002* (2013.01); *H04R 3/14* (2013.01); *H04R 5/02* (2013.01); *H04R 5/04* (2013.01);
(Continued)

(58) Field of Classification Search
None
See application file for complete search history.

(56) References Cited

U.S. PATENT DOCUMENTS

2007/0286427 A1 12/2007 Jung et al.
2014/0286511 A1 9/2014 Nakano
(Continued)

FOREIGN PATENT DOCUMENTS

CN 105075293 A 11/2015
CN 106034274 A 10/2016
(Continued)

OTHER PUBLICATIONS

International Search Report dated Nov. 27, 2019 for PCT Appn. No. PCT/CN2019/077139 filed Mar. 6, 2019, 9 pgs.
(Continued)

*Primary Examiner* — Antim G Shah
(74) *Attorney, Agent, or Firm* — Brooks Kushman P.C.

(57) ABSTRACT

An apparatus to realize the virtual height and surround effect. The apparatus includes at least an input source, a processor and front speaker. The input source provides the input signals on front, surround and height channels input into the processor in which a beamforming, channel separation and/or virtual-height effect are applied on each of the source channels, respectively. After the processing, all produced output channels output by the processor are arranged and combined into existing speakers of the soundbar.

17 Claims, 3 Drawing Sheets

(51) Int. Cl.
*H04R 5/02* (2006.01)
*H04R 5/04* (2006.01)
*H04S 3/02* (2006.01)

(52) U.S. Cl.
CPC ................ *H04S 3/008* (2013.01); *H04S 3/02* (2013.01); *H04S 2400/01* (2013.01); *H04S 2420/01* (2013.01)

(56) References Cited

U.S. PATENT DOCUMENTS

| | | | | |
|---|---|---|---|---|
| 2016/0182996 | A1 | 6/2016 | Takumai | |
| 2017/0034639 | A1* | 2/2017 | Chon | H04S 3/008 |
| 2017/0325043 | A1 | 11/2017 | Jot et al. | |
| 2020/0045493 | A1* | 2/2020 | Bharitkar | G10L 19/008 |

FOREIGN PATENT DOCUMENTS

| | | | |
|---|---|---|---|
| CN | 108319445 | A | 7/2018 |
| JP | 2008227804 | A | 9/2008 |
| WO | 2018026799 | A1 | 2/2018 |

OTHER PUBLICATIONS

Extended European Search Report mailed Sep. 19, 2022 for European Application No. 19917890.6, 8 pgs.

* cited by examiner

VIRTUAL HEIGHT AND SURROUND EFFECT IN SOUNDBAR WITHOUT UP-FIRING AND SURROUND SPEAKERS

CROSS-REFERENCE TO RELATED APPLICATIONS

This application claims priority to PCT Patent Application No. PCT/CN2019/077139, filed Mar. 6, 2019, and entitled "VIRTUAL HEIGHT AND SURROUND EFFECT IN SOUNDBAR WITHOUT UP-FIRING AND SURROUND SPEAKERS", the entire disclosure of which is incorporated herein by reference.

TECHNICAL FIELD

One or more embodiments relate to an apparatus and method for realizing virtual height and surround effect, and more particularly for realizing virtual height and surround effect by front speakers in soundbar without up-firing or surround speakers.

BACKGROUND

Currently in home theaters, the input source of movie usually comprises many channels, such as front, surround and height channels. Normally, the front speakers (left, right and center) reproduce the main content of the movie, while the other speakers generate the surround and immersive listening experience. By using the speaker products of the prior art, to realize the surround or height effect the speakers need placing physically in different locations in the room, such as located around the room and on the ceiling, which may increase the difficulty in installing the speakers and reduces the aesthetics of the room. Even with an integrated sound speaker, in order to add the height effect, up-firing speakers must be used therein, which limits the thickness of the speaker design, and such sound speakers cannot be designed in an ultra-thin style to meet the aesthetic trends and the practical applications.

Nowadays soundbar system is widely used in the home theater for its simplified speaker configuration. However, limited by the size, a soundbar usually only has the front speakers and they are all positioned in a small chamber. Hence, the sound field is narrow and the immersive experience is small. Some digital signal processing methods have been used in the soundbar, but each of the input channels is simply mixed rather than processed separately, and thus neither the sound field is natural nor the immersive experience can be improved. Unlike the discrete 5.1/7.1 channel speaker system, where small or a non-existent surround effect can be heard from the conventional one-piece soundbar. Compared to it, the conventional soundbar cannot produce any height effect. Some soundbars can be designed to have some up-firing speakers, but these speakers bring many strict directivity requirements and the appearance of the product is limited.

SUMMARY

The present disclosure overcomes some of the aforementioned drawbacks by providing an apparatus and method for realizing the virtual height and surround effect by front speakers in a soundbar. In particular, the soundbar in the present invention may comprise the front-firing speakers or side-firing speakers, but does not exist any up-firing or surround speakers.

According to one aspect, the apparatus for realizing a virtual height and surround effect by front speakers comprising an input source including at least one of front, surround, and height channels; a processor configured to perform optimizing processes on input signals from the at least one of front, surround, and height channels of the input source, respectively; and front speakers comprising a plurality of speakers. Output signals from the processor are fed to the front speakers after processing via the processor.

The front channels of the input source comprise at least one of left/right channels. The surround channels of the input source comprise at least one of left/right surround channels. The height channels of the input source comprise at least one of left/right height channels.

The processor comprises a beamforming processor applying the beamforming on the at least one of left/right channels, a surround-effect processor applying the channel separation on the at least one of left/right surround channels, and a height-effect processor applying both channel separation and the head-related transfer function (HRTF) on the at least one of the left/right height channels.

Alternatively, the processor further comprises a channel-speaker matrix for arranging and combining all the produced virtual channel into the existing plurality speakers of the front speakers.

The front speakers are integrated into a soundbar without any up-firing speakers or surround speakers.

Alternatively, the beamformer processor further applies a transfer function during applying the beamforming.

Alternatively, the surround-effect processor further applies a cross-cancellation function while applying the channel separation.

Alternatively, the height-effect processor further applies both the cross-cancellation function while applying the channel separation and the measured head-related transfer function and while applying the head-related transfer function (HRTF).

According to another aspect, the method for realizing virtual height and surround effect by front speakers comprising the steps of receiving input signals from at least one of front, surround, and height channels of an input source; performing, via a processor, optimizing processes on the signals from the input source; and feeding output signals output by the processor after processing via the processor to front speakers.

Alternatively, performing the optimizing processes comprises applying a transfer function on the at least one of the left/right channels to produce at least one of virtual left/right channels, respectively.

Alternatively, performing the optimizing processes comprises applying the channel separation with preferably setting a crosstalk cancellation function on the at least one of the left/right surround channels to produce at least one of virtual left/right surround channels, respectively.

Alternatively, performing the optimizing processes comprises applying both the channel separation process with setting the crosstalk cancellation function and the head-related transfer function with setting the measured head-related transfer function on the at least one of the left/right height channels to produce at least one of virtual left/right height channels, respectively.

Alternatively, arranging and combining, via a channel-speaker matrix, the output signals of at least all the produced virtual channels to the plurality of speakers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The object of the invention is to apply different optimizing processes to different input source channels to respectively produce the corresponding virtual channels, and reasonably combine all the produced channels into the existing speakers of the soundbar which has neither of up-firing nor surround speakers, so that the virtual sound field can be expanded and immersive experience can be generated.

The speakers provided in the present invention only include the front-firing speakers and possibly side-firing speakers. However, neither up-firing nor surround speakers are present therein, which enables the speaker apparatus of the present invention can be realized as a one-piece soundbar. In this case, the soundbar speaker can be designed in an ultra-thin form while achieving the virtual surround and virtual height effect. In the invention, each channel has been applied the most suitable and effective processing to achieve a high virtual feeling and a small distortion sound effect.

A. Front Channels of Input Source.

The front channels of the input source usually include left, right and center channels. In the prior art, the signals from these channels are directly fed to the front firing speakers in soundbar, so the listener receives the direct sound from these speakers and relatively lower level sound reflection from the walls of the listening room. Since the left/right channels received by the listener indicate the width of the sound field, listeners mostly locate the sound source from the front speakers with a very narrow sound field, almost depending on the length of the soundbar.

Figure 1:
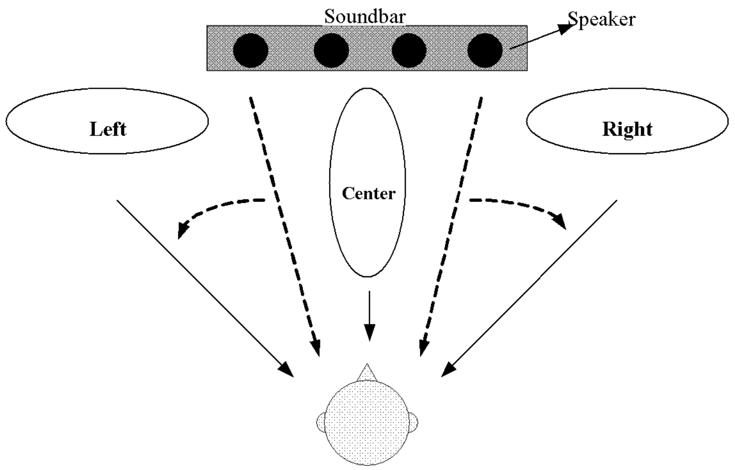
FIG. 1 is a schematic diagram illustrating the virtual sound field with the beamforming applied in the front channels of input source according to one embodiment of the invention.
Figure 2:
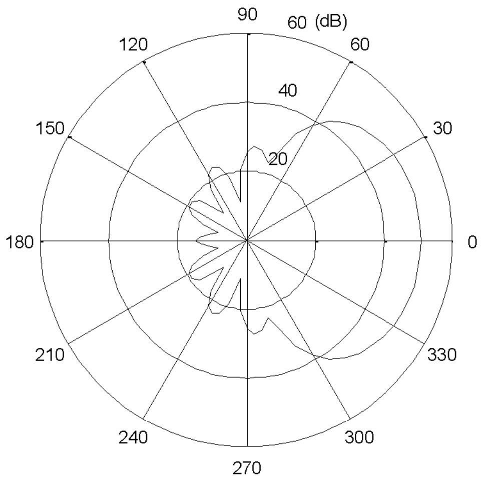
FIG. 2 is a graph illustrating the directivity pattern of the target beamformer at 1 kHz in the beamforming process of FIG. 1.

Referring to FIGS. 1-2, in order to expand the sound field, some beamforming processes are used on the left/right channels of the input source, as shown in FIG. 1. Let p(r) represent the total sound pressure at position r, $$p(r)=\Sigma_{k=1}^{K}H(r_k)q_k \qquad (1)$$

where $q_k$ is the speaker strength of the kth speaker in the soundbar, K is the number of the speakers, $H(r_k)$ is the transfer function between the kth speaker and the optimized position r, which is decided by the width of the sound field which we want to expand to. The transfer function $H(r_k)$ can be calculated based on the theorical model, or measured under the ideal condition. Preferably, the transfer function $H(r_k)$ can be measured in site where the soundbar is actually used. In one aspect, the virtual sound field defined by the produced virtual channels may be, for example, a target area with radius of about 3-4 m. The sound pressure can be rewritten in matrix form as:

$$p=Hq \qquad (2)$$

Using some beamforming processes, for example, via the pressure-matching method, the speaker strength can be calculated and the beamformer $w_k$ can be obtained, $$q=H^{H}p \qquad (3)$$

$$w_k=A_kq_k \qquad (4)$$

where $A_k$ is the tuning parameter for frequency response improved, and the superscript H denotes the conjugate transpose of the matrix.

After beamforming, the virtual left/right channels are produced and received by the listener, which indicate a virtual sound field with wider width. Listeners may locate the sound source from the virtual left/right channels with a wider virtual sound field as shown in FIG. 1.

FIG. 2 illustrates one typical directivity pattern of the target beamformer, which determines the sound pressure p(r).

B. Surround Channels of Input Source.

Traditional surround speakers are positioned on both sides of the listener. When listeners use the one-piece soundbar, such listeners feel little or even no surround effect, since the surround signal is also reproduced by the front speakers. Thus, the Interaural Level Difference and Interaural Time Difference are very small. These two parameters are the main clues for perceived sound location.

Figure 3:
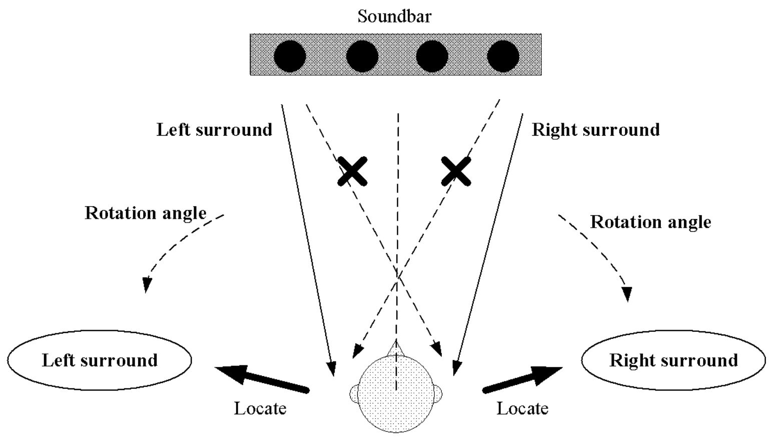
FIG. 3 is a schematic diagram illustrating how listeners locate the virtual sound source as on the sides in the virtual sound field with the channel separation applied in the front channels of according to another embodiment of the invention.
Figure 4:
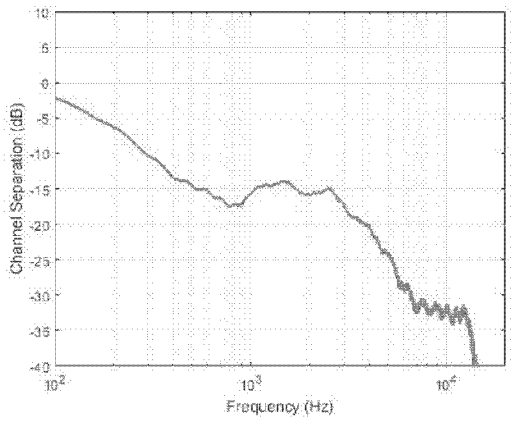
FIG. 4 is a graph illustrating one example about channel separation with the ratio of the received signals at right ear to left ear when only inputting the left signal.

Referring to FIGS. 3-4, in order to enhance the clue, it may be necessary to obtain the higher channel separation, which is the difference of the received signals at between left/right ear per each input channel. Therefore, the listeners can virtually perceive the sound from the side, because the Interaural Level Difference can be larger with higher channel separation, and the listener will be deceived to locate the sound source on the side.

FIG. 3 shows the theory how listeners locate the sound source on the sides. Theoretically, the higher the channel separation is, the larger the rotation angle can be as shown in FIG. 3. In one aspect, the rotation angle of a virtual surround channel may be up to 120 degrees, for example. Preferably, the virtual sound field with larger virtual surround channels makes the listener feel like the sound source is located behind the listener. In another aspect, the virtual surround channels may be rotated by less than the 120-degree amount, but 60-70 degree rotation angles are essential.

In order to achieve higher channel separation, one of the methods is to apply the crosstalk cancellation. Let $G(r_k)$ be the crosstalk cancellation function between the kth speaker and the optimized position r. The signals received by two ears are given by s, $$s=Hq \quad (5)$$

$$q=Gd \quad (6)$$

$$e=d-s \quad (7)$$

where G is the matrix of $G(r_k)$, and d is the desired received signals received by the two ears of the listener. To minimize the error signals e, G is given by:

$$G=[H^H H]^{-1} H^H \quad (8)$$

Using the channel separation method, the high channel separation can be obtained, as shown in FIG. 4.

C. Height Channels of Input Source.

There are usually two types of height channel speaker used in the prior art, down-firing speaker on the ceiling and up-firing speaker in the soundbar. The down-firing speaker playbacks the height channel signal of the input source directly to the listener, while the up-firing speaker makes the sound reflected by the ceiling. Whichever type of speaker is used, the listener is of the impression that the sound source is from the ceiling.

When using the conventional one-piece soundbar, up-firing speaker is the only choice, but this may not be allowed to configure due to the limitation of the industrial design and system configuration.

Figure 5:
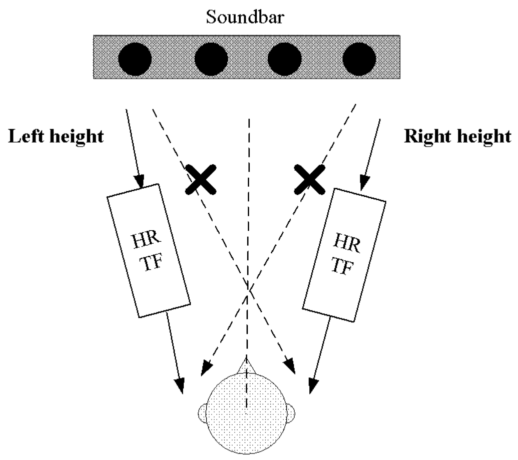
FIG. 5 is a schematic diagram illustrating the virtual sound field with the virtual-height effect applied in the front channels of the input source according to another embodiment of the invention.

Referring to FIG. 5, it is possible to use some virtual height processes on the front-firing speaker in soundbar without any up-firing speakers. A human hearing system is not so sensitive to the Interaural Time Difference coming from the elevation angle difference of the sound source position compared to the azimuth angle difference. This is the case since a human's our ears are horizontally positioned on both sides of the user's head. However, the frequency response difference due to our ears being vertically asymmetrical can generate more clues to perceive the location of the sound source. Therefore, when the front-firing speaker plays back the height channel signal with applying the head-related transfer function, the front-firing speaker can also provide the virtual height effect.

FIG. 5 demonstrates the principle of the virtual height method, in which "HRTF" refers to the head-related transfer function between the ceiling and the ears with an elevation angle. In one aspect, the range of the elevation angle of a virtual height-effect channel may be from 30-90 degrees, for example. Preferably, the virtual sound field with appropriate virtual height-effect channels makes the listener feels like the sound source is located on the ceiling of the listening room. In another aspect, an elevation angle of 60 degree is preferable. To increase the virtual height effect, the channel separation method is also used to reduce the crosstalk confusion. The HRTF can be measured in an anechoic chamber by using desired elevation angles. As for the height channel, Eq. (8) can be modified as, $$G_{height}=C_{HRTF}[H^H H]^{-1} H^H \quad (9)$$

where, $C_{HRTF}$ is the measured head-related transfer function assuming under an ideal condition in the anechoic chamber.

With applying the channel separation process and the HRTF, the virtual left/right height channels are produced which brings the virtual height effect.

D. Combination of all Channels

Figure 6:
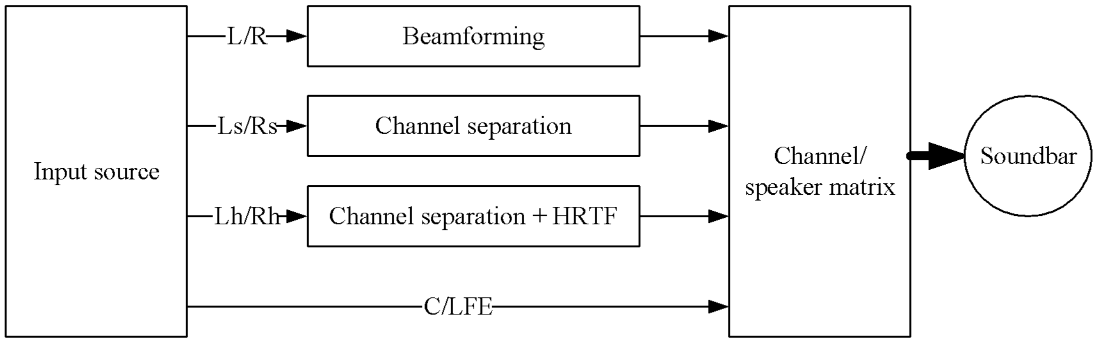
FIG. 6 is an exemplary block diagram of the apparatus or method for realizing the virtual height and surround effect of the invention.

FIG. 6 shows the block diagram of this invention. Channels "L/R", "Ls/Rs", "Lh/Rh" and "C/LFE" indicate the left/right, left surround/right surround, left height/right height and center/low frequency extension channels, respectively. The channel-speaker matrix arranges and combines all these channels after virtual processing to the different speakers. Because of the limited number of the speakers in the soundbar, the output signals from different virtual channels may need to be arranged and combined into the same speaker. For example, there are four speakers in the soundbar. After processing the beamforming on the L/R channel, the number of the produced virtual channels are four per input channel, while for Ls/Rs and Lh/Rh channel, the number of the produced virtual channels after processing are two per input channel. One example of the channel-speaker matrix can be described as Table 1.

Since a different channel signal is mostly uncorrelated to one other, the influence between different channels on the same speaker will be very small. Therefore, the signal from the different channel can mix with each other. After combining these three methods, the sound field can be expanded and immersive listening experience can be generated with virtual height and surround effect.

TABLE 1

One example of the channel-speaker matrix

| | Speaker 1 | Speaker 2 | Speaker 3 | Speaker 4 |
|---|---|---|---|---|
| Left | ● | ● | ● | ● |
| Right | ● | ● | ● | ● |
| Left surround | ● | ● | | |
| Right surround | | | ● | ● |
| Left height | ● | ● | | |
| Right height | | | ● | ● |
| Center | | ● | ● | |
| LFE | ● | ● | ● | ● |

To complete the apparatus, it can be conceivable that after output from the channel-speaker matrix of the processor, at least a Digital-to-Analog Converter and a power amplifier, for example, may be further applied in turn to the processed channels before entering the speakers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An apparatus for realizing a virtual height and a surround effect by front speakers, comprising:

an input source configured to provide input signals via at least one of front, surround, and height channels;

a processor configured to perform optimizing processes on the at least one of front, surround, and height channels of the input source; and front speakers comprising a plurality of speakers;

wherein output signals after processing via the processor are fed to the front speakers, wherein the height channels of the input source comprise at least one of left/right height channels, and the processor comprises a height-effect processor which applies both a channel separation and a head-related transfer function on the at least one of the left/right height channels to produce a plurality of virtual left/right height channels, respectively, wherein the front channels of the input source comprise at least one of left/right channels, and the processor further comprises a beamforming processor configured to apply beamforming on the at least one of the left/right channels to produce a plurality of virtual left/right channels, respectively, and wherein a number of the plurality of virtual left/right channels produced by the beamforming processor is greater than a number of the plurality of virtual left/right height channels produced by the height-effect processor.

2. The apparatus of claim 1, wherein the beamforming processor is further configured to set a transfer function to apply the beamforming.

3. The apparatus of claim 1, wherein the surround channels of the input source comprise at least one of left/right surround channels, and the processor further comprises a surround-effect processor which applies channel separation on the at least one of the left/right surround channels to produce a plurality of virtual left/right surround channels, respectively.

4. The apparatus of claim 3, wherein the surround-effect processor sets a crosstalk cancellation function while applying the channel separation.

5. The apparatus of claim 1, wherein the height-effect processor sets a crosstalk cancellation function and the head-related transfer function comprises setting a measured head-related transfer function.

6. The apparatus of claim 1, wherein the apparatus further comprises a channel-speaker matrix, by which the output signals are arranged and combined to the plurality of speakers.

7. The apparatus of claim 1, wherein the front speakers are integrated into a soundbar.

8. The apparatus of claim 1, wherein up-firing speakers or surround speakers are absent from the plurality of speakers.

9. The apparatus of claim 1, wherein the plurality of virtual left/right channels and the plurality of virtual left/right height channels are provided as the output signals to the front speakers.

10. A method for realizing virtual height and surround effect by front speakers, the steps of the method comprising:

receiving input signals from at least one of front, surround, and height channels of an input source, wherein the height channels of the input source comprise at least one of left/right height channels;

performing, via a processor, optimizing processes on the input signals from the at least one of front, surround, and height channels of the input source, respectively; and feeding output signals after processing via the processor to the front speakers, and applying, via a height-effect processor, both a channel separation and a head-related transfer function on the at least one of the left/right height channels to produce a plurality of virtual left/right height channels, respectively, wherein performing the optimizing process further comprises applying a beamforming process on at least one of left/right channels of the front channels of the input source to produce a plurality of virtual left/right channels, respectively, and wherein a number of the plurality of virtual left/right channels produced by the beamforming processor is greater than a number of the plurality of virtual left/right height channels produced by the height-effect processor.

11. The method of claim 10, wherein applying the beamforming process comprises setting a transfer function.

12. The method of claim 10, wherein applying the channel separation includes setting a crosstalk cancellation function.

13. The method of claim 10, wherein applying the channel separation includes applying a crosstalk cancellation function, and applying the head-related transfer function comprises applying a measured head-related transfer function.

14. The method of claim 10, further comprising arranging and combining, by a channel-speaker matrix, all produced virtual channels into a plurality of speakers.

15. The method of claim 10, wherein the front speakers are integrated into a sound bar.

16. The method of claim 10, wherein up-firing speakers or surround speakers are absent from a plurality of loudspeakers included in the front speakers.

17. The method of claim 10, wherein feeding output signals after processing via the processor to the front speakers includes feeding at least the plurality of virtual left/right channels and the plurality of virtual left/right height channels as the output signals to the front speakers.

* * * * *